United States Patent [19]

Bloch

[11] 4,102,052
[45] Jul. 25, 1978

[54] DEFLECTION INDICATOR FOR COUPLINGS

[75] Inventor: Heinz P. Bloch, Baytown, Tex.

[73] Assignee: Exxon Research & Engineering Co., Linden, N.J.

[21] Appl. No.: 750,521

[22] Filed: Dec. 14, 1976

[51] Int. Cl.² .................. G01B 5/25; G01B 11/27
[52] U.S. Cl. ........................... 33/180 R; 33/84; 33/286; 73/136 A; 403/335
[58] Field of Search ............ 33/180 R, 174 R, 168 R, 33/84, 286; 73/136 A; 116/114 R, 114 A, 115, 124 A, DIG. 21; 403/335, 336, 337, 338, 13, 14, 27

[56] References Cited

U.S. PATENT DOCUMENTS

| 697,701 | 4/1902 | Ayer | 33/168 R |
|---|---|---|---|
| 1,323,046 | 11/1919 | Gildner | 403/335 |
| 2,516,854 | 8/1950 | Christian | 33/180 R |
| 3,163,037 | 12/1964 | Kawabata | 73/136 A |
| 3,688,570 | 9/1972 | Burke | 73/136 A |
| 3,762,217 | 10/1973 | Hagen | 73/136 A |
| 3,828,562 | 8/1974 | Petres | 73/136 A |
| 3,871,215 | 3/1975 | Pratt | 73/136 A |

FOREIGN PATENT DOCUMENTS 1,301,283  12/1972  United Kingdom .................. 403/27

Primary Examiner—Henry K. Artis
Assistant Examiner—Willis Little
Attorney, Agent, or Firm—F. Donald Paris

[57] ABSTRACT

An indicator for use in monitoring and determining axial deflection or positioning of a coupling, e.g., of the flexible diaphragm type, wherein a pair of suitably configured indicia such as stepped edge decals are located on opposite ends of the coupling torque tube or spacing member adjacent each coupling hub. Initially each coupling guard ring covers a portion of the indicia, while leaving the remainder exposed. This is indicative of the normal nondeflected position of the diaphragm or similar flexible coupling component. As the shaft rotates, a stroboscope is employed to flash a light frequency corresponding to the rotational speed of the shaft and in the event there is axial misalignment the indicia will appear to deviate from their normal nondeflected position such that more or less of the indicia will be seen as the torque tube or spacing member is observed with the strobe light applied to it.

13 Claims, 8 Drawing Figures

DEFLECTION INDICATOR FOR COUPLINGS

BACKGROUND OF THE INVENTION

Conventional turbomachinery couplings transmit torque flexibly across concentric gear meshings, i.e., via mating internal/external teeth. Misalignment of the gear mesh relationship during operation produces sliding between mating teeth which will cause wear and demands on lubrication. There has been introduced into the turbomachinery industry new industrial couplings which are known as flexible diaphragm couplings. While the overall configuration of these couplings introduces various advantages, they also add a further andna new constraint to the design of coupled machinery. This is that there is a limit on the maximum allowed axial displacement of the coupled shafts during operation. Conventional gear couplings are relatively insensitive to axial displacement because of their spline-like relationship, whereas the diaphragm couplings are sensitive to such misalignment and if overstretched or excessively compressed axially, may be subject to failure by fatigue in less than $10^8$ shaft revolutions. Certain shaft temperatures and relative coefficients of thermal expansion either must be assumed or calculated to determine the initial amount of lateral and axial offset required in coupled machinery in order to produce minimum axial (and also angular) displacement after achieving anticipated operating temperatures. It is necessary, however, for these couplings to function properly during transient deflections which are associated with startup, shutdowns, and upsets which cannot be calculated in a straightforward manner. Thus, it is important to have a continuous monitoring system of axial displacement in those situations where the axial displacement is known to be sensitive to process load changes or there is a lack of confidence in the ability to predict the expected values of displacement.

To provide the necessary onstream axial displacement monitoring, there have been provided various commercial designs, none of which have been fully satisfactory in offering a low cost system which is simple in design and has absolutely no shutdown risk in the event that the monitoring device fails, and has the capability of repeating measurements. Some of these devices are of extremely high cost and very complex, while others such as those which employ a Vernier scale manual monitoring system are unsatisfactory from a safety standpoint. Still other Vernier type deflection indicators are indistinguishable under stroboscopic light examination. Some systems like that of U.S. Pat. No. 3,828,562, only provide a general indication of an axial position of the shaft within the tube by means of special markings and do not provide for remote readout like the present invention. Exemplary of devices which employ optical electronics and are highly complex and expensive are those disclosed in U.S. Pat. Nos. 3,762,217 and 3,871,215 which are both for torque and speed sensing. U.S. Pat. No. 3,688,570 discloses an angular deflection meter which, while perhaps less costly, is substantially more susceptible to contamination by dirt and grime and is relatively complex to mount, which is also true of some of the other prior art devices.

Thus, it is apparent from the prior art that there is a need for a deflection indicator device and/or system for use in connection with couplings of the flexible diaphragm type, which avoids and overcomes these deficiencies.

SUMMARY OF THE INVENTION

The present invention relates to monitoring devices and/or systems for monitoring couplings misalignment and more particularly, to a device according to a preferred embodiment comprising a stepped-edge deflection indicator decal which when mounted on a coupling shaft, can be used in conjunction with a stroboscopic light for monitoring diaphragm deflection and consequently axial misalignment. The stepped deflection decal according to the present invention is located on the coupling torque tube or spacing member adjacent each of the coupling hubs. A stroboscopic light flashes on the decals at a frequency corresponding to the rotational speed of the shaft. If there is axial misalignment the normal nondeflected position of each decal will deviate with either more or less of the indicia being seen, which then can be correlated with the degree of axial misalignment of the coupled shafts. The preferred embodiment employs the decal which is secured to the torque tube or center tube of the coupling, which tube has a fixed length. Typically, one coupling would be mounted on the end of the driver shaft and the other hub on the driven machine's shaft. The machines are usually spaced apart so that the distance from the hub flange is nearly equal to the dimension between diaphragm edges of the couplings. The single-piece center tube and diaphragm combination generally resembles a spool and is inserted between the hub flanges. After bolting the spool in place, the diaphragms are in their neutral undeflected position and the coupling guards which comprise annular discs bolted to the hub flanges with the diaphragm rim sandwiched between them, are located in place covering some of the steps of the deflection decals while leaving others exposed. This would typically represent the axially aligned or neutral position of the coupling. As the machinery is operated a stroboscopic light at a preset frequency shines on each decal and the number of steps observed during rotation of the machinery would be indicative of whether the diaphragms have undergone outward deflection, thus causing increase in the axial shaft-to-shaft distance or an inward deflection which would correspond to a lesser number of indicia being seen as the light flashes and which is a decrease in the axial shaft-to-shaft distance. It also is contemplated to imprint suitable indicia directly on the decal which then can be properly placed on the tube and used to monitor deflection. Thus, there has been provided according to the present invention a deflection indicator device in the form of indicia such as a decal, which is significantly lower in cost compared to the more sophisticated complex and expensive coupling deflection monitoring devices now available. The present invention can perform onstream monitoring without the need for subsequent interpretation of the readout, it provides for quick observation at an early and sometimes critical point of essentially high deflection so that corrective steps can be initiated when the equipment is first started, and it provides a device which requires substantially no maintenance.

The foregoing and other objects and advantages of the present invention will be apparent to those skilled in the art upon reading of the following detailed description in conjuction with the accompanying drawings.

DESCRIPTION OF THE PREFERRED EMBODIMENTS

Figure 1:
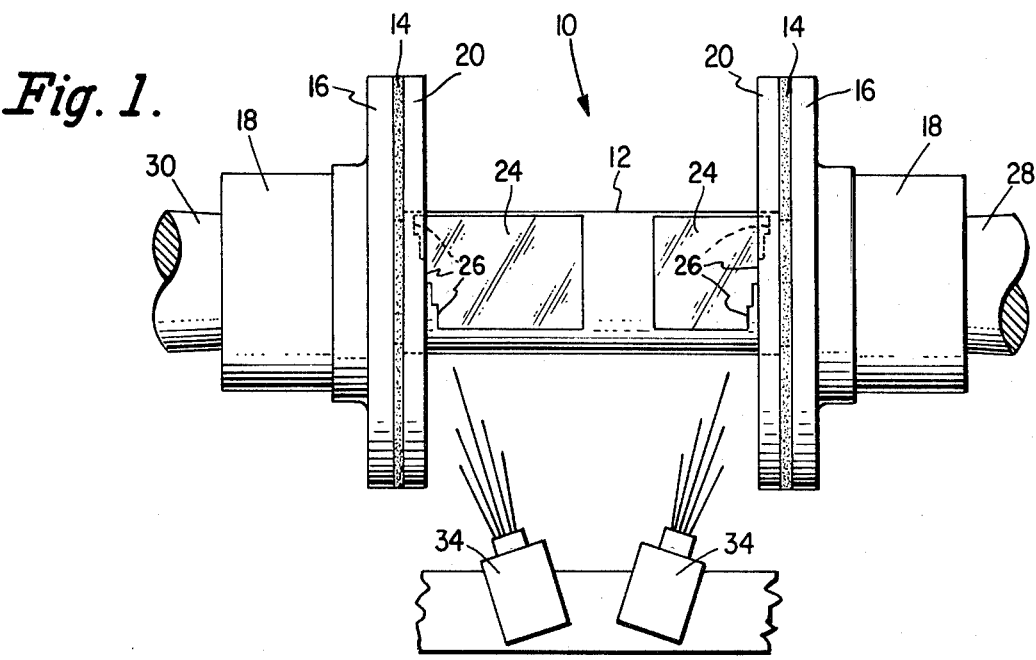
FIG. 1 illustrates a flexible diaphragm industrial coupling incorporating deflection indicator decals with schematically shown stroboscopic lights, according to the present invention.

Referring now to the drawings wherein like parts are designated by the same reference numeral throughout the several views, there is shown in FIG. 1 as a conventional flexible diaphragm industrial coupling, generally designated 10. This standard coupling comprises a spacing member such as a torque tube 12 having at opposite ends thereof a pair of thinly profiled diaphragms 14 of annular configuration and welded, e.g., by electron beam, to the tube. The outer diameters of the diaphragms are bolted to a rim 16 which is an integral part of coupling flanges 18. These flexible diaphragm discs permit limited angular misalignment and axial displacement between the coupling flanges and spacer or torque tube without the transmission of large axial forces or moments. On the side of the coupling on which is located the torque tube, there is provided a suitable guard ring 20. These rings have a central bore 22 (See FIG. 2) whose dimension is slightly larger, preferably no more than 0.030 inches larger than the outer diameter of the torque tube 12. The guard bore 22 is disposed in horizontal relation with respect to the outer surface of the central tube and cannot be chamfered or radiused. The purpose of this will be discussed in detail hereinafter. Mounted on the central shaft at opposite ends adjacent each diaphragm are decals 24 constructed according to a preferred embodiment of the present invention. These decals are generally rectangular and along one transverse edge thereof are provided with a stepped configuration comprising steps 2b each of which has a predetermined width, e.g., corresponding to about 0.020 inch, or 0.5 mm although other widths are contemplated depending on the application. The decals may comprise any type of material, preferably, however, they should comprise a metal which would be longer lasting and thus less subject to wear, damage, etc. The decals are situated on the torque tube at locations adjacent and partly underlying each of the guard rings. It is essential that there be two deflection indicator decals bonded or otherwise secured to the shaft in order to provide an indicator of axial misalignment for each of the coupled shafts 28 and 30. Typically turbomachinery shafts are tapered at the hub engagement, e.g. approximately 1¾°, as shown by shaft 28 in FIG. 2. The stepped edge decal can be bonded to the torque tube of the coupling by welding or some other suitable fastening means such as glue. The torque tube typically has a fixed length generally a fraction of an inch shorter than the distance between the ends of the driven (e.g., driven shaft 28) and the driving machinery (e.g., driver shaft 30) and the flexible diaphragm 14 is welded to each end of the central torque tube. The two machines are generally spaced apart so that the distance between the hub flanges 16 is substantially equal to the overall dimension from diaphragm 14 to the opposite diaphragm 14b.

Figure 2:
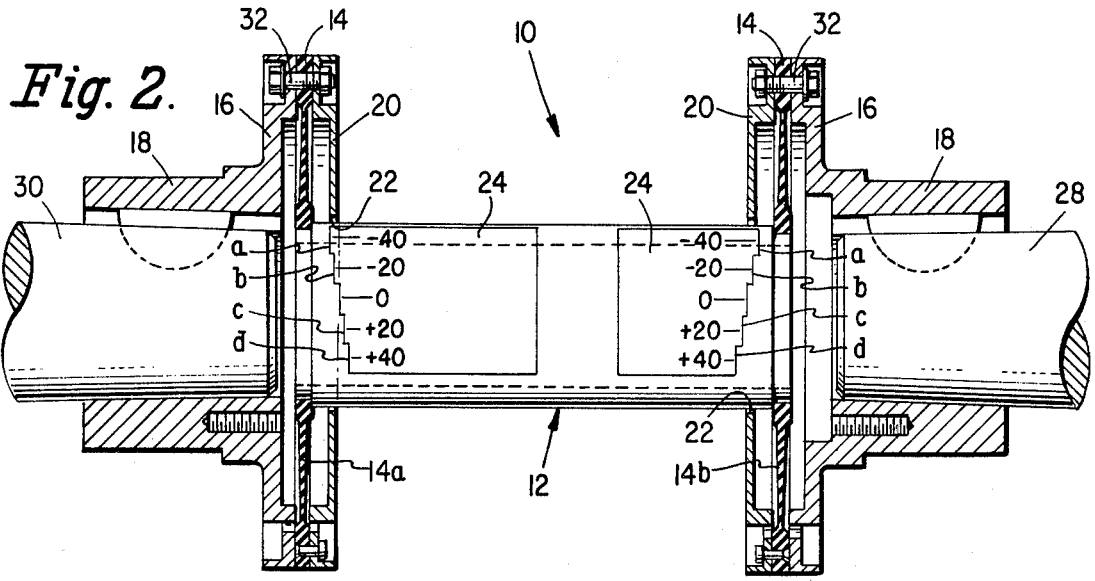
FIG. 2 is a cross-sectional view of the coupling of FIG. 1 absent the stroboscopic lights, illustrating further details of the present invention with the shafts ready to start and the diaphragms in their undeflected position.
Figure 3:
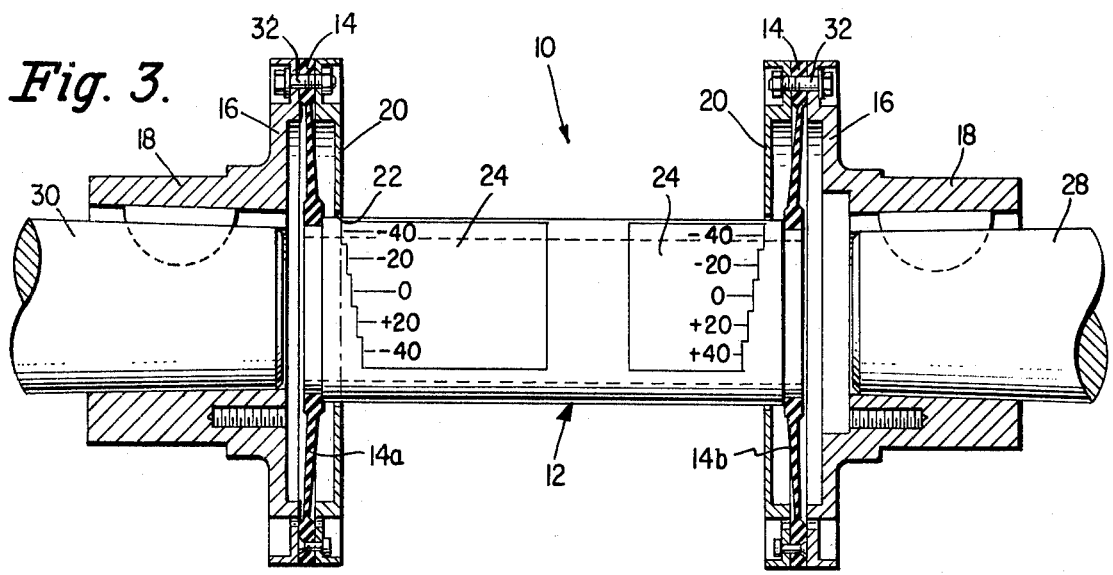
FIG. 3 illustrates the couplings of FIG. 1 with the shafts having moved apart.
Figure 4:
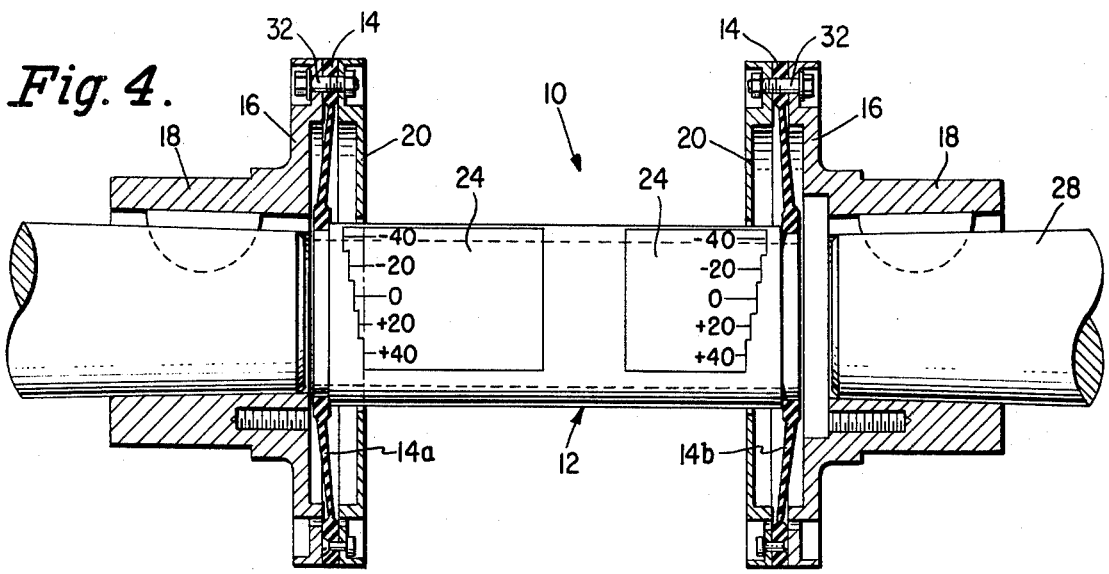
FIG. 4 illustrates the couplings of FIG. 1 with the shafts grown towards each other.

As shown in FIG. 2, the diaphragms 14 are in their neutral unstretched position. The coupling guards 20 which basically comprise annular discs bolted at 32 to the hub flanges have the diaphragm 14 rim sandwiched between them and the decals 24 are located such that the guard covers some of the steps 26 of the decal while leaving others exposed. The step designated "O" corresponds to the neutral or undeflected position. The machinery shown in FIG. 2 is ready to begin operation and the diaphragms are in their undeflected position. When the machinery is operating the stroboscopic light from standard strobes 34 causes the decal's edge to be seen for example as shown in FIGS. 3 and 4. In FIG. 3, the left guard 20 as seen would appear about aligned with edge "a" or in other words (if each step is 0.02 inches) two steps away from the neutral or "O" edge which is 0.04 inches (if each step is 0.02) while the right guard would appear directly opposite edge "a" of the other decal. The location of the decal in a circumferential direction is not important and can be relatively arbitrary. With the machine started as shown in FIG. 3 the shafts 28, 30 of the coupled machinery are illustrated as having "shrunk" or moved apart, i.e., the diaphragms 14 are stretched outwardly. By monitoring the relative locations of the stepped edges of the decals with the stroboscope, the offset of the decal steps from their neutral or aligned position can be determined. In the event of axial misalignment such as shown in FIG. 3, the stroboscopic examination of the relative guard positions illustrate the left guard 20 two steps or 0.04 inches away from the neutral or "O" edge, while the right guard is also opposite or aligned with edge "a" which also corresponds to a 0.04 inch right-based misalignment. This means that each diaphragm is being stretched approximately 0.04 inches and if the original dimension between extremities of the hubs 18 is considered as "L", there is now a dimension of "L" plus 0.08 inches. The number of steps which are now seen provide the indication of the outward stretching of the axes of the shafts 28 and 30.

Turning not to FIG. 4, another situation is illustrated with the machine shafts moving or growing towards each other. This results in a push being exerted on the diaphragms. As shown the left guard appears to have moved 0.04 inches inward to stop "d", while the right guard 20 also is opposite step "d" instead of "O". Thus, with an original dimension of "L", this has now been decreased by 0.08 inches and would correspond to L minus 0.08 inches.

It is important that at the central bore the guard ring 20 overlie the respective decal 24 and that the bore dimension be no more than about 0.03 inches larger than the outer diameter of the torque tube. This together with avoiding chamfering and radiusing will provide for optimum observation of the steps when under stroboscopic examination. While the steps as illustrated for purposes of this disclosure are 0.02 inches, other convenient dimensions are also possible which would depend upon the type of monitoring operations being performed. The amount of tolerable axial misalignment would be indicative of the dimensions employed. Also, while the illustrated decals may have a dimension of e.g., 2½ by 3½ inches, various other convenient sizes also are possible.

Figure 8:
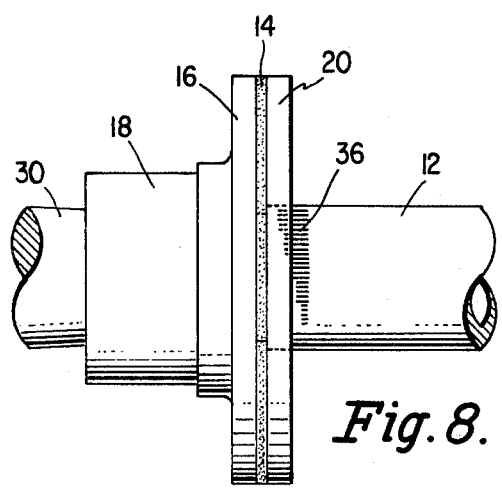
FIG. 8 illustrates deflection indicia incorporated directly onto the coupling torque tube or spacing member.
Figure 5:
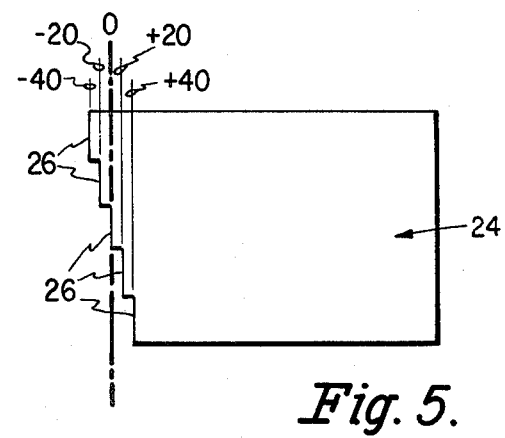
FIG. 5 illustrates a deflection indicator decal per se constructed according to the present invention.
Figure 6:
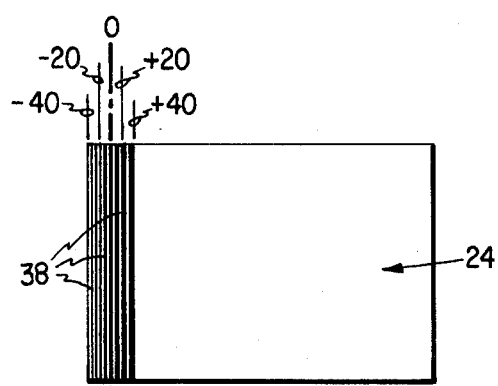
FIGS. 6 and 7 illustrate alternate embodiments of the decal with different types of deflection indicia.

It should be noted that the stroboscopic principle used is conventional. The standard stroboscope comprises an instrument having general utility in the study of moving machinery by optically freezing the rotating or oscillating part. In accordance with such instruments the flashing light produced is adjusted to have a repetition rate equal to the rotational speed of the part being observed, whereupon the part appears stationary and can be freely examined for faults. Thus it will be possible to see more or less steps relative to the neutral position of the decal's indicia. It is contemplated that a portable battery-operated stroboscope be used by a relatively untrained operator for observing at periodic intervals the shaft axial alignment. While two strobes are shown in FIG. 1, this is only for purposes of illustration and a single one could be used and alternately used to monitor the shafts. Although the preferred embodiment discloses decals with stepped edges for providing the necessary observable indicia for monitoring purposes, it is also within the contemplation of the invention to machine grooves or other visible indicia into the torque tube that would basically correspond to a stepped decal arrangement only formed directly on the tube. This is shown by the series of grooves 36 arranged in a stepwise way in FIG. 8. Likewise, other indicia such as starts, dots, triangles, etc., could be employed to form the actual step configuration on the tube which would be visible under stroboscopic examination. Other alternatives within the contemplation of the present invention include the use of different indicia configurations formed on a transverse edge of the decal. Thus, as shown in FIG. 6, the indicia lines 38 can extend parallel with the decal edge so that when placed on the shaft they will extend circumferentially. Also, the lines may increase in thickness or depth or as shown become gradually darker from the edge inwardly in order to facilitate monitoring. A stepped groove arrangement like FIG. 8 can include the same lines 36 on the decal (like in FIG. 6) only extending perpendicular with respect to the decal edge so that when the decal is on the shaft they will extend axially with respect to the tube axis.

Figure 7:
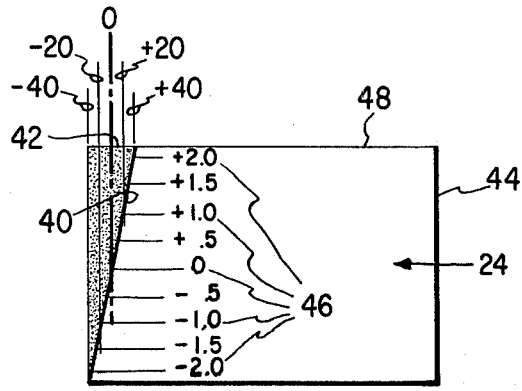

FIG. 7 illustrates alternate embodiments wherein the decal 24 either has its edge formed with a slope 40, which can be appropriately marked with lines or dots along the length thereof in order to itself provide the necessary indicia relative to a central or neutral point which can be designated "O". The remaining locations can also be designated such as by the designation ± 20,40 which would correspond to a predetermined amount of deflection in inches or millimeters. While the sloping line 40 is shown imprinted on the rectangular decal 24, that line may actually form the edge of the decal with the remaining portion being cut off. Another version as best illustrated also in FIG. 7 and which is easily manufactured is accomplished by dividing the dimension 44 of the decal into a given number of equally-spaced lines which effectively divides the distance 42 located at the end along the upper edge 48 of the decal 24 into the same number of equally-spaced steps. Each of these is designated by an appropriate indicia designated 46 adjacent a corresponding line parallel with the upper edge 48 to provide a convenient indication of deflection on the decal when placed on the tube with the indicia lines 46 extending in the axial direction of the tube being monitored as described heretofore. By making the dimension 44 of the decal relatively large, then the separation between the indicia 46 can be relatively wide and the numbers can be made visible to facilitate the monitoring. A decal constructed in accordance with the foregoing would be relatively easy to manufacture since there is no need to form the decal with steps along the transverse edge since it is only needed to print appropriate lines such as the sloping line 40 and the indicia and their corresponding lines 46 on the decal. Thus, when the machine is operating under stroboscopic examination, with the decal properly placed, such that the guard covers a predetermined portion of the sloping line 40 such as from reference point "O" to the extreme negative end of the line, then as the machinery is operating the amount of that edge appearing will be indicative of any change in shaft alignment. It also will provide an indication of the nature of the change, i.e., either growth or decrease, depending upon the indicia 46 which are seen during the monitoring process.

A typical example may be that the distance 42 would be 5 mm, having a tolerance of ±0.1mm. The equal spacing as shown by the visible numerical indicia 0.5, 1.0, 1.5 and 2.0 would then correspond to a deflection for example in mm, either positive or negative, depending upon the amount of the sloping line 40 which is covered. The illustrated embodiment could measure up to the total deflection of 2.5mm if the guard during monitoring completely covers the sloping line 40. The other extreme would be a negative deflection of −2.5mm, i.e., if the guard during monitoring permitted the entire line 40 to be seen. Thus, the upper edge 48 would correspond to +2.5mm whereas the opposite or bottom edge would correspond to −2.5mm.

Numerous alternatives to the structure herein disclosed have been made and other alternatives will suggest themselves to those skilled in the art. However, it is to be understood that the present disclosure relates to a preferred embodiment of the invention, which is for purposes of illustration only and not to be construed as limitation of the invention. All such modifications which do not depart from the spirit of the invention are intended to be within the scope of the appended claims.

What is claimed is:

1. A system for monitoring axial deflection in turbomachinery coupling when operating in the presence of stroboscopic flashing of predetermined frequency, including a torque tube having at least a flexible diaphragm at an end thereof adapted to coupling a shaft thereto, and an inner guard having a central bore substantially parallel with and radially spaced from the outer surface of said central tube, and deflection indicator means on said tube adjacent and partly underlying said guard, said indicator means including a plurality of indicium constructed and arranged for providing an indication of axial positioning of said shaft when coupled to said coupling with respect to said tube when viewed in the presence of said flashing, said indicium including first indicia corresponding to an axially aligned position of said coupling with said shaft and second and third indicium for indicating axially misaligned positions thereof, wherein said second indicia correspond to a misalignment in a first direction and said third indicia correspond to misalignment in a second direction opposite to said first direction.

2. The device of claim 1 including first and second diaphragm at opposite ends of said tube for coupling respective shafts thereto, and first and second of said inner guards adjacent said diaphragms, fist and second indicator means on said tube adjacent and underlying corresponding one of said first and second guards, said second indicia of said indicator means corresponding to a decreased distance between said diaphragms with respect to said axially aligned position and said third indicator of said indicia means corresponding to an increased distance between said diaphragms with respect to said aligned axial position.

3. The system of claim 1 wherein said indicator means comprises a first decal including said indicia along one edge thereof and secured to said tube.

4. The system of claim 2 wherein said indicator means comprises first and second decals including said indicia along one edge thereof and secured to said tube.

5. The system of claim 3 wherein said decal includes a stepped configuration along said one edge.

6. The system of claim 4 wherein said first and second decals each include a stepped configuration along said one edge.

7. The system of claim 3 wherein said decal comprises indicia along only one edge thereof.

8. The system of claim 1 wherein said fist indicia corresponds to the neutral axially nonmisaligned position of said shaft with said coupling and substantially underlie said bore with an equal amount of second and third indicia appearing axially outward of said guard.

9. The system of claim 3 wherein said decal comprises a sloping configuration along said one edge.

10. The system of claim 3 wherein said decal is substantially rectangular and includes an imprinted sloping line adjacent said one edge thereof and having indicia spaced along said sloping line.

11. The system of claim 10 wherein said indicia are equally spaced along said sloping line above and below a neutral reference point for providing an indication of change in axial shaft alignment with respect thereto.

12. The system of claim 10 wherein said indicia comprise a plurality of equally-spaced lines extending about the circumference of said shaft in the direction of said shaft axis, each of said lines having a corresponding visible reference character associated therewith for providing an indication of shaft alignment and misalignment.

13. The system of claim 10 wherein said sloping line includes indicia equally spaced along said line which indicia extends circumferentially about said shaft, said line having a first end spaced inwardly a predetermined distance from said one edge along an upper line of said decal and the opposite end of said line terminating at the end of said one edge of said bottom line opposite said upper line.

* * * * *